United States Patent [19]

Obara

[11] Patent Number: 4,924,458
[45] Date of Patent: May 8, 1990

[54] MULTIPLEX COMMUNICATION SYSTEM

[75] Inventor: Keiichi Obara, Hachioji, Japan

[73] Assignee: Kabushiki Kaisha Toshiba, Kawasaki, Japan

[21] Appl. No.: 207,660

[22] Filed: Jun. 16, 1988

[30] Foreign Application Priority Data

Jun. 18, 1987 [JP] Japan .................................. 62-151720

[51] Int. Cl.$^5$ ................................................ H04J 3/08
[52] U.S. Cl. ................................. 370/58.1; 370/110.1; 370/85.1
[58] Field of Search ................. 370/58, 85, 110.1, 109, 370/118, 85.1, 58.1, 85.11, 85.13, 110.3

[56] References Cited

U.S. PATENT DOCUMENTS

4,623,760 11/1986 Binkerd et al. .................... 370/110.1
4,641,300 2/1987 Wurst ..................................... 370/85

Primary Examiner—Douglas W. Olms
Assistant Examiner—Christopher O. Edwards
Attorney, Agent, or Firm—Finnegan, Henderson, Farabow, Garrett and Dunner

[57] ABSTRACT

A multiplex communication system includes a plurality of exchanges and multiplex communication apparatuses connected to at least one exchange through a plurality of lines. Each of the multiplex communication apparatuses comprises first registers for storing first selection number information from the lines and second registers for fetching and storing second selection number information from an associated one of the exchanges, and is arranged such that a CPU of the associated communication apparatus determines that the exchange is to perform its interrupting operation and causes encoders and decoders to be switched to their through mode when the first selection number information stored in the first registers coincides with the second selection number information stored in the second registers.

23 Claims, 9 Drawing Sheets

FIG. 6 Part 1

FIG. 6 Part 2

MULTIPLEX COMMUNICATION SYSTEM

BACKGROUND OF THE INVENTION

1. Field of the Invention

The present invention relates to a digital network system which comprises voice (telephone) communication trunk exchanges and a plurality of multiplex communication apparatuses and, more particularly, to multiplex communication apparatuses used in such a system to realize digital compression transmission of voice signals with a high quality.

2. Description of the Related Art

Figure 9:
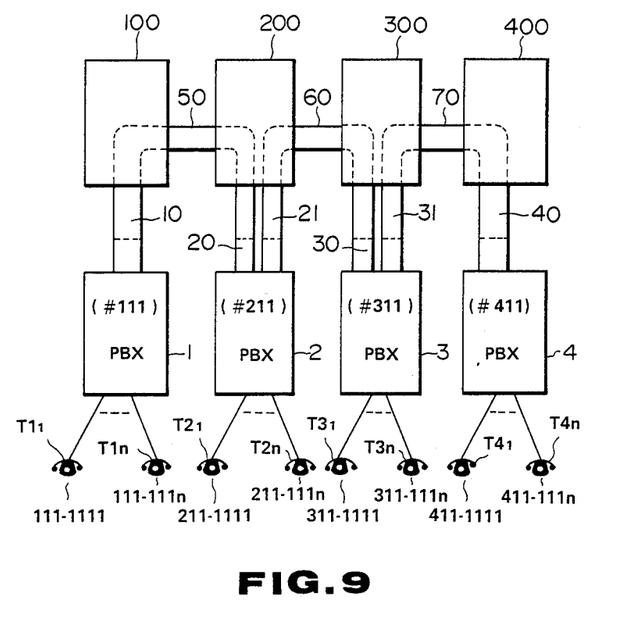
FIG. 9 is a block diagram of a digital network system using a conventional multiplex communication system.

There is shown in FIG. 9 a conventional digital network system in which private branch exchanges (hereinafter, which will be referred to merely as PBX's) 1 to 4 each having a relay function are connected through trunk lines 10, 20, 21, 30, 31 and 40 to conventional multiplex communication apparatuses 100, 200, 300 and 400, respectively. The multiplex communication apparatuses (100 and 200), (200 and 300) and (300 and 400) are coupled with each other by means of digital multiplex lines 50, 60 and 70, respectively. The PBX's 1 to 4 are connected to telephone set terminals $T1_1$ to $T1_n$, $T2_1$ to $T2_n$, $T3_1$ to $T3_n$ and $T4_1$ to $T4_n$, respectively.

Symbols #111 to #411 in the blocks 1 to 4 represent the selection numbers of PBX1 to PBX4 respectively, while the seven digit numbers under the respective telephone terminals represent the selection numbers of the respective telephone terminals.

In such a system, when it is desired to call the telephone terminal $T4_1$ from the telephone terminal $T1_1$, the operation is as follows. That is, when selection number information indicative of (411-1111) is sent out from the telephone terminal $T1_1$, the PBX1 receives the information, detects that the upper three digits (411) of the information do not coincide with the selection number (111) of the PBX1 itself, and sends the selection number information (411-1111) onto the trunk line 10. This information in turn is transmitted to the PBX2 through the multiplex communication apparatus 100, the digital multiplex line 50, the multiplex communication apparatus 200 and the trunk line 20. When PBX2 receives the selection number information (411-1111), it detects the incoincidence of its own selection number (211) with that of the received information and sends out the selection number information (411-1111) onto the trunk line 21. Similarly, PBX3 detects the incoincidence of the information that is finally sent to PBX4 where the coincidence is detected. PBX4, when detecting the coincidence, detects that the telephone terminal $T4_1$ corresponding to the lower four digits (1111) of the input selection number information is in its idle state and generates a ringing signal for the terminal $T4_1$.

Meanwhile, the multiplex communication apparatuses 100 to 400 each have an encoder/decoder section for compression transmission of PCM voice codes, that is, a section which decodes a voice signal coming from the associated digital multiplex line and sends it to the related PBX while encoding a voice signal sent from the related PBX and sends it out onto the associated digital multiplex line. For this reason, this system has had such a problem that, when a voice signal is to be transmitted through a plurality of such multiplex communication apparatuses, this requires the repetitive encoding and decoding of the signal, thus deteriorating the quality of the voice signal. For instance, where a voice signal sent from PBX 1 is transmitted to PBX 4, useless encoding and decoding operations of the signals are repeated by the multiplex communication apparatuses 200 and 300, thus deteriorating the quality of the voice signal. Further, when the encoding system employed involves a relatively large time delay in the encoding and decoding operations, the repetition of the encoding and decoding operations disadvantageously results in the fact that the delay time is increased.

In this way, such a prior art multiplex communication system as mentioned above, in which the multiplex communication apparatuses are arranged respectively to decode a voice signal coming from the associated line send it onto the associated PBX while encode a voice signal sent from the PBX and send it onto the line, has been defective in that the exhibition of the relay function of the PBX's requires the repetition of the encoding and decoding operations with the result of deterioration of the voice quality and the increase of the delay time of the voice signal.

Therefore, in view of the above problems in the prior art multiplex communication system, it is an object of the present invention to provide a novel multiplex communication system which eliminates the problems in the conventional system which can prevent the deterioration of the quality of a voice signal even during the PBX relay operation and also can prevent the increase of a delay time of the voice signal.

SUMMARY OF THE INVENTION

The present invention is directed to a multiplex communication system including a plurality of exchanges and multiplex communication apparatuses connected to at least one exchange through a plurality of lines, each of which apparatuses comprises decoding means for decoding voice signals sent from the lines and sending them to the exchanges, encoding means for encoding voice signals sent from the associated exchange and sending them to the lines, means for sending to the exchange selection number information received from the lines, means for sending to the lines selection number information sent from the exchange, first storage means for fetching and storing the selection number information provided from the lines, second storage means for fetching and storing the selection number information provided from the exchange, and encoding and decoding control means for reading the selection number information stored into the first storage means as well as the selection number information stored into the storage means and for inhibiting operations of the encoding means and the decoding means when both of the information coincide with each other.

With the foregoing arrangement, since the selection number information stored into the first storage means coincides with that fetched into the second fetching means, the exhibition of the relay function of the PBX connected to the associated multiplex communication apparatus can be monitored, in which case the encoding and decoding operations are stopped and thus the calling side terminal can eventually be coupled to the terminal to be called without intervention of a plurality of encoders and decoders.

In this way, in accordance with the present invention, when it is desired that the PBX connected to the multiplex communication apparatus performs its relay function, the voice signal is passed as it is without any subjection of encoding and decoding operations, whereby the deterioration in the quality of the voice signal as well as the time delay in the signal can be prevented.

DESCRIPTION OF THE PREFERRED EMBODIMENTS

Figure 2:
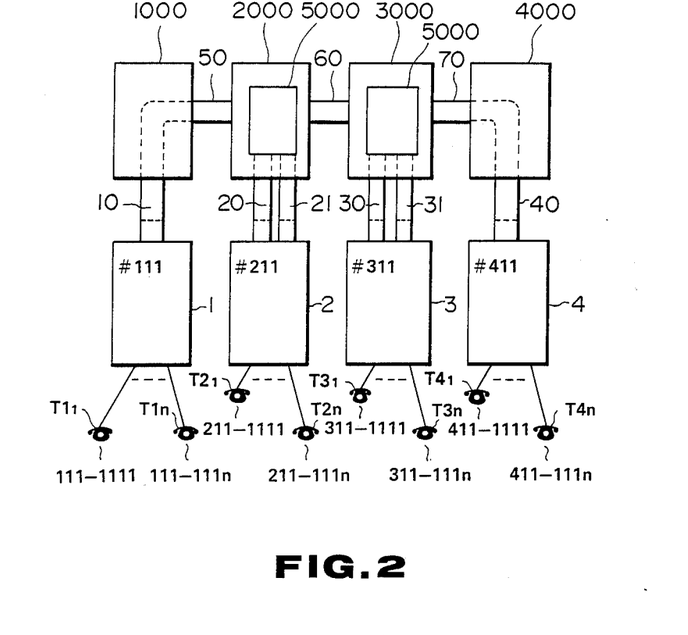
FIG. 2 is a block diagram of a digital network system using the multiplex communication system of the embodiment of the present invention.

An embodiment of the present invention will be explained by referring to drawings. Shown in FIG. 2 is a block diagram of a digital network system which contains multiplex communication apparatuses 1000 to 4000 according to one embodiment of the present invention, and in which the same constituent elements as those in FIG. 9 are denoted by the same reference numerals and explanation thereof will be omitted. Each of the multiplex communication apparatuses 2000 and 3000 contains a control block 5000 which functions to prevent the deterioration of the quality of a voice signal when PBX2 and PBX3 respectively exhibit their exchanging functions. The remaining multiplex communication apparatuses 1000 and 4000 may also contain the control block 5000, but do not contain the control block in the illustrated embodiment because they are not connected with any PBX's for relay operation.

Figure 1:
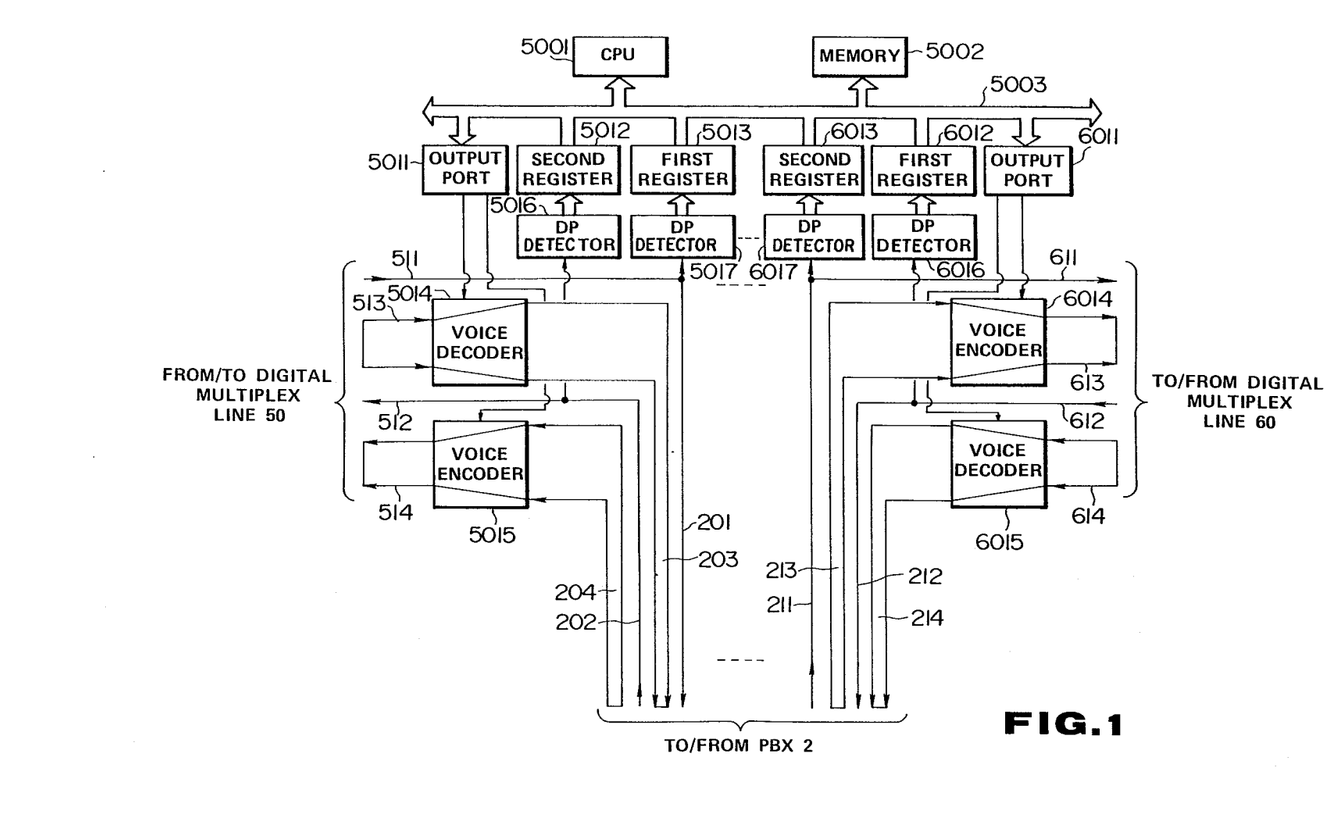
FIG. 1 is a block diagram of a major part of one of the multiplex communication apparatuses of a multiplex communication system in accordance with an embodiment of the present invention.
Figures 8A, 8B:
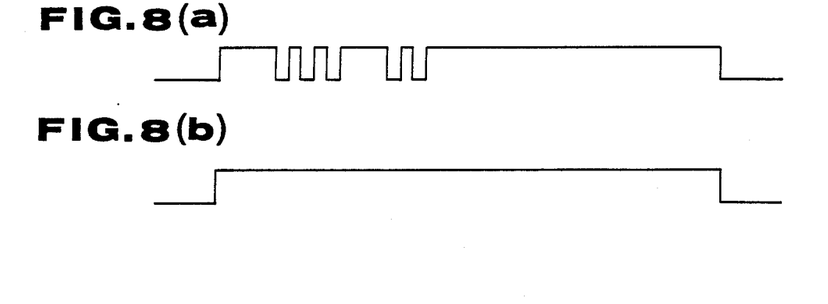
FIG. 8A and 8B show waveforms of signals for explaining the operation of the embodiments of FIG. 1 and FIG. 7.

Referring to FIG. 1, there is shown a detailed block diagram of the control block 5000 in each of the multiplex communication apparatuses, wherein although an arrangement corresponding to only one channel is shown in FIG. 1 for convenience of explanation, the associated multiplex communication apparatus actually has an arrangement corresponding to many channels. In the drawing, reference numeral 5001 denotes a CPU, 5002 a memory, 5011 and 6011 output ports, 5013 and 6012 first registers (input ports), 5012 and 6013 second registers (input ports) respectively, these elements being mutually interconnected through a bus 5003. Numerals 5014 and 6015 denote respectively a voice decoder for decoding a compressed voice (hereinafter, which will be sometimes referred to merely as the voice decoder), while 5015 and 6014 denote respectively a voice encoder for compressing and decoding a voice (hereinafter, which will be sometimes referred to merely as the voice encoder). Signalling tones (selection number information) coming from the digital multiplex line sides are sent to the first registers 5013 and 6012 through signal lines 511 and 612 and dial pulse detectors (which will be hereinafter referred to as DP detectors) 5017 and 612 respectively, and also sent to the PBX through signal lines 201 and 212, respectively. Signalling tones coming from the PBX are sent to the second registers 6013 and 5012 through signal lines 211 and 202 and dial pulse detectors (which will be hereinafter referred to as DP detectors) 6017 and 5016 respectively, and also sent to the digital multiplex line side through signal lines 611 and 512, respectively. The signalling tone used in the embodiment is such a signal that rises from its OFF level to ON level when the system is changed to a calling mode, followed by pulses corresponding in number to the dial number data and finally falls from its ON level to OFF level when the system is changed to an on-hook mode, as shown in FIG. 8(a).

Compressed voice signals coming from the digital multiplex lines are sent through signal lines 513 and 614 to voice decoders 5014 and 6015 to be decoded and then are sent throught signal lines 203 and 214 to the PBX, respectively. Voice signals, on the other hand, coming from the PBX are sent through signal lines 213 and 204 to voice encoders 6014 and 5015 to be encoded and then are sent through signal lines 613 and 514 to the digital multiplex lines, respectively. The CPU 5001 controls output ports 5011 and 6011 to output encode and decode disable signals to stop the decoding and encoding functions of the voice decoders 5014, 6015 and the voice encoders 5015, 6014 at a predetermined timing under the control of a program stored in the memory 5002, respectively.

The operation of the control block 5000 arranged as mentioned above when the PBX exhibits its relay function will be explained with reference to FIGS. 3 to 5. Explanation will now be made as to the control block 5000 contained in the multiplex communication apparatus 2000.

Figure 3:
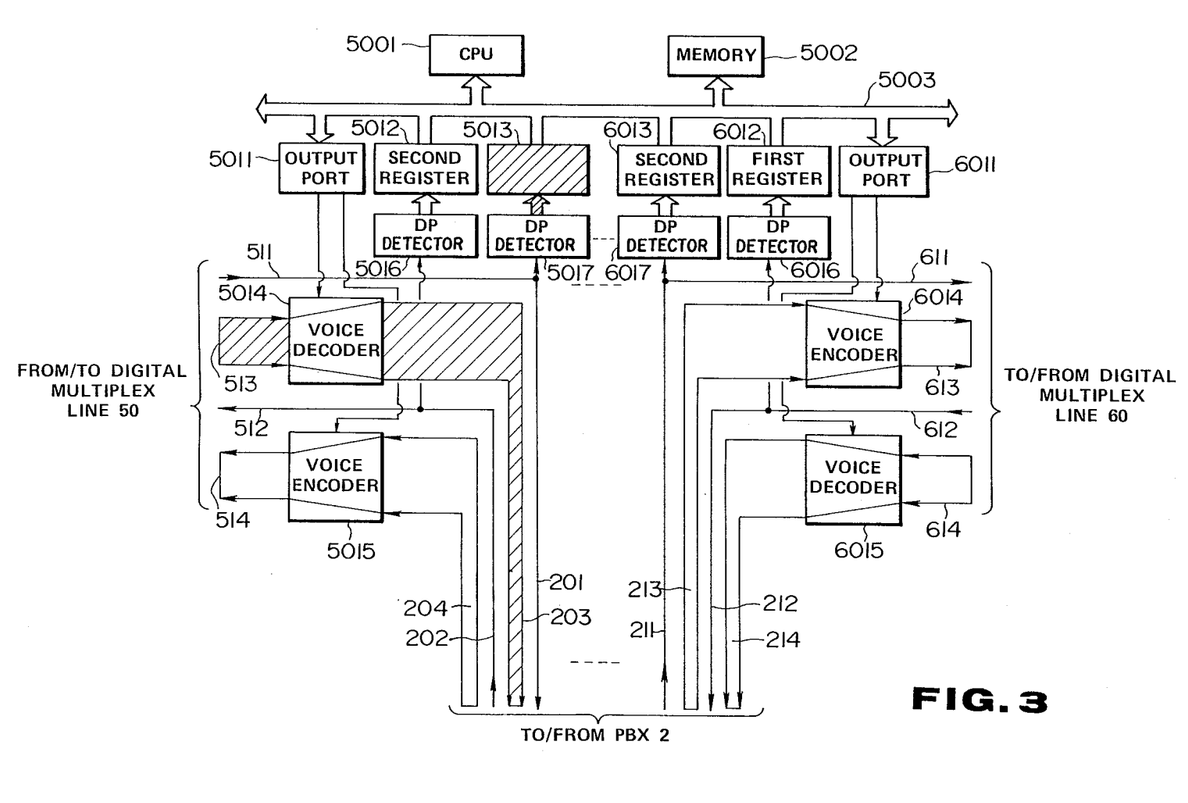
FIGS. 3 to 5 are block diagrams for explaining the operation of the major part of FIG. 1 respectively.

FIG. 3 shows a state when the apparatus 2000 receives a new call signal from the side of the digital multiplex line 50. In this case, a call signalling tone (411-1111), for example is transmitted through signal line 511 to signal line 201 and also to DP detector 5017 where the dial data contained in the signalling tone is detected and sent to the first register 5013 to be stored therein (refer to thick lines and areas covered with slanted lines in FIG. 3). A compressed-voice signal, on the other hand, is sent through signal line 513 to the voice decoder 5014 to be decoded and then sent through signal line 203 to PBX2 (corresponding to an area covered with slanted lines). At this time, PBX2 performs control over its received signal, that is, detects that the received signal is not for its own office because the upper three digits (411) of the received signal is different from its own selection number (211), and selects one channel (in the illustrated embodiment, correspond to a channel containing the signal lines 211 to 214) of the trunk line 21 to put the PBX2 in its relay operation.

Figure 4:
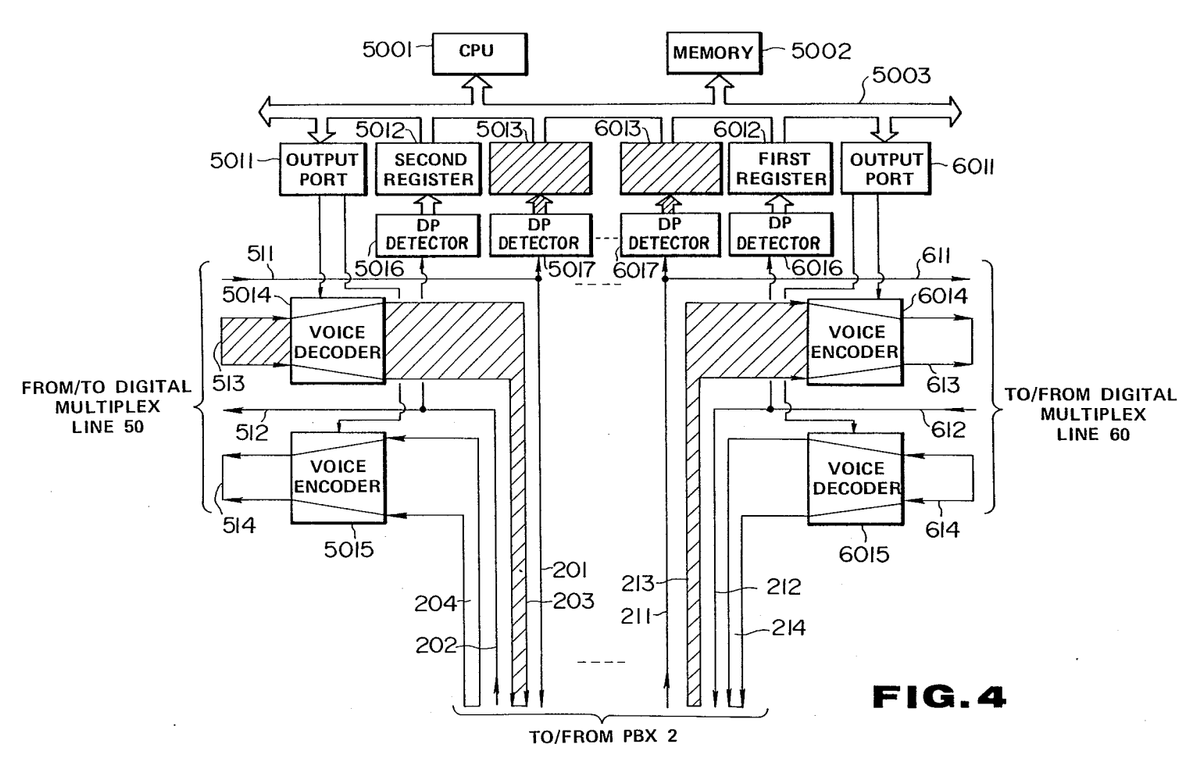

As shown in FIG. 4, PBX2 transmits the signalling tone (411-1111) through signal line 211 to DP detector 6017. Then, the detector 6017, when receiving the signalling tone, detects the dial data contained in the tone and sends it to the second register 6013 to be stored therein and also through signal line 611 to the digital multiplex line 60 (which corresponds to thick lines and areas drawn by slanted lines in FIG. 4). The PBX2 also transmits a voice signal onto the signal line 213. As a result, the voice signal is encoded by the voice encoder 6014 and then transmitted to the digital multiplex line 60 through the signal line 613 (corresponding to an area drawn by slanted lines in FIG. 4).

Figure 5:
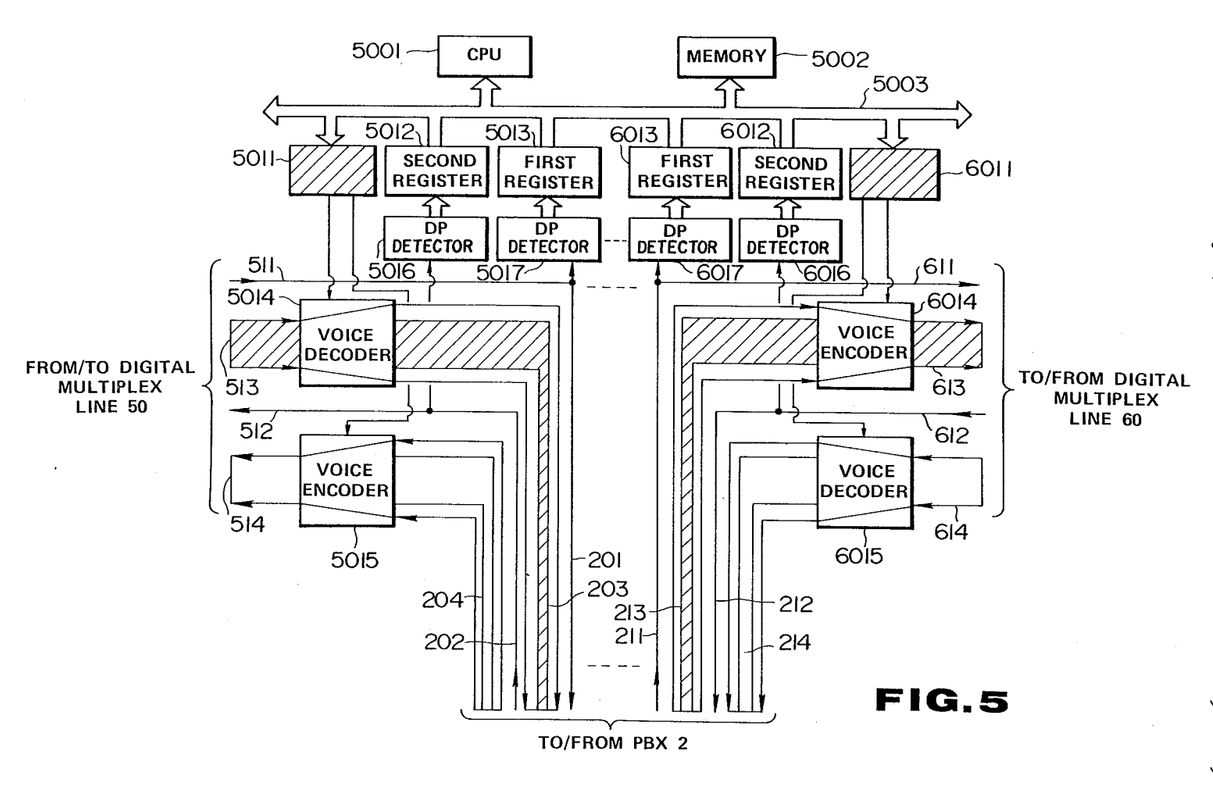

At this stage, the CPU 5001 fetches information from the first and second registers 5013 and 6013; and, (1)

when the information in the registers coincides with each other and (2) when the selection number information provided to the second register 6013, confirms that the trunk containing signal lines 201 to 204 and the trunk containing signal lines 211 to 214 are both in a call processing mode and not in a conversation mode nor in a disconnection mode (which the modes CPU 5001 can confirm, for example, on the basis of an answer signal or the like sent from the signal line 202), the CPU 5001 causes output ports 5011 and 6011 to output respectively the encode and decode disable signals, thereby putting voice decoder 5014 and voice encoder 6014 into their through mode (in which mode, the decoding and encoding functions are stopped) (refer to FIG. 5). As a result, the compressed-voice signal input from digital multiplex line 50 is transmitted through PBX 2 to digital multiplex line 60, while not being subjected to any decoding and encoding by the decoder 5014 and the encoder 6014. Similarly, a compressed-voice signal input from digital multiplex line 60 is also transmitted through PBX2 to digital multiplex line 50, without any encoding and decoding. In this way, the PBX 2 can perform its relay function.

Under the above-mentioned condition, if a selection number information (211-1111) for example is input, then PBX 2 performs an extension processing operation, so that, when telephone terminal T2$_1$ is put in its conversation mode, PBX 2 sends out an answer signal onto signal line 202 so that the CPU 5001 confirms the aforementioned conditions (1) and (2) to stop the multiplex communication apparatus in the state of FIG. 3.

The operation as explained above is shown in FIG. 6 in the form of a flowchart of the operation of the CPU 5001. More specifically, CPU 5001 first checks whether or not first registers 5013 and 6012 have received a call signal (step 521). When either of the first registers 5013 or 6012 detects the call signal (the one of the registers which has received the call signal will be referred to as first register $\alpha$, hereinafter), the CPU checks whether or not the first register $\alpha$ has received a selection signal (step 522). When detecting the reception of the selection signal at the first register $\alpha$ having received the call signal in the step 522, the CPU reads the received selection signal as a selection signal A (step 523). Subsequently, the CPU sets a timer which times out after expiration of a predetermined time (step 524).

Figure 6:
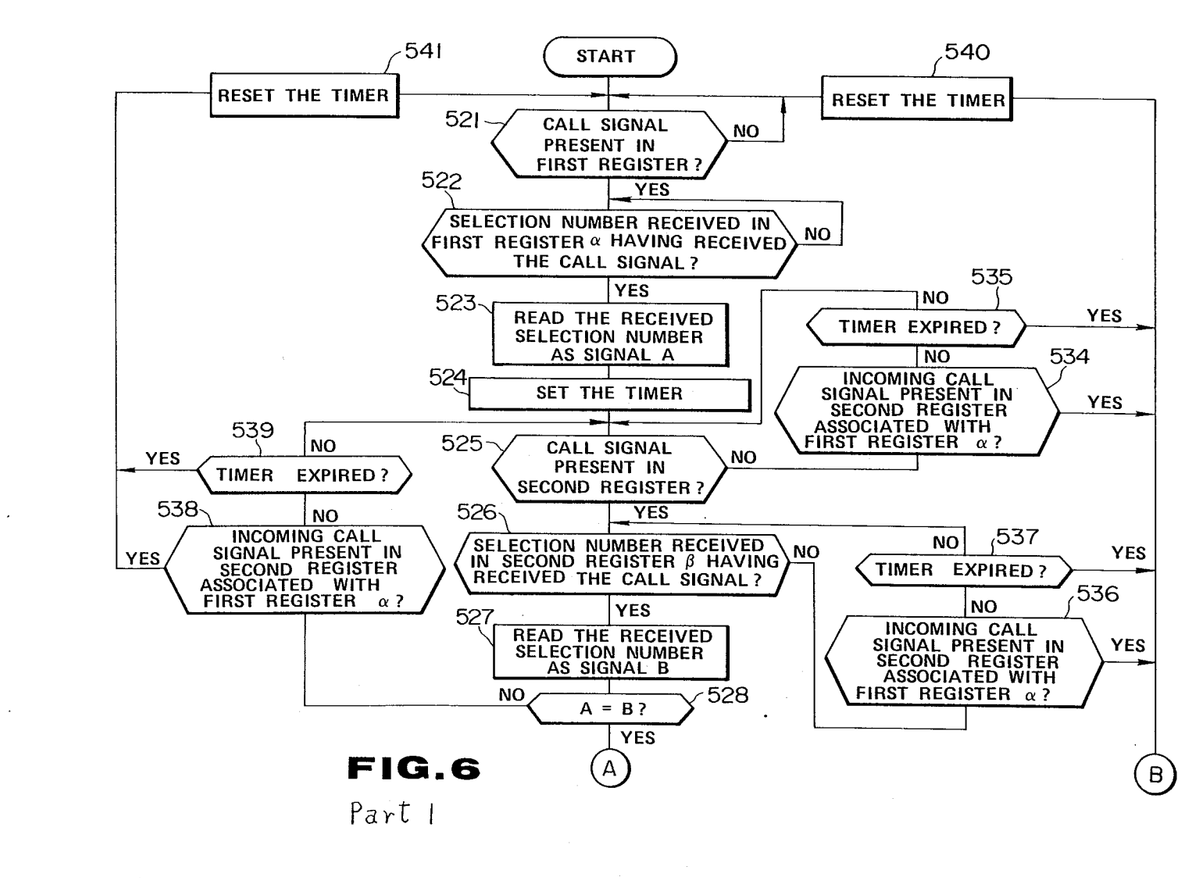
FIG. 6 parts 1 and 2 is a flowchart for explaining the operation of the major part of FIG. 1.

Next, the CPU checks whether or not second registers 5012 and 6013 have received a call signal (step 525). If the CPU detects that either of the second registers 5012 or 6013 has received the call signal (the one of the registers which has received the call signal will be referred to as second register $\beta$, hereinafter), then the CPU checks whether the second register $\beta$ has received a selection signal (step 526). If the CPU detects that the second register $\beta$ having received the call signal has received the selection signal, then the CPU reads out the received selection signal as a selection signal B (step 527). Subsequently, the CPU examines whether or not the selection signal A read out in the step 523 coincides with the selection signal B read out in the step 527 (step 528). When A=B, the CPU determines that PBX 2 connected to its own multiplex communication apparatus is to perform its relay function and the CPU causes the voice decoders and voice encoders corresponding to the first and second registers $\alpha$ and $\beta$ to be set in the through mode (step 529). Thereafter, the CPU resets the timer (step 530).

When a disconnect (release) signal exists on both lines corresponding to the first and second registers $\alpha$ and $\beta$, the CPU causes the voice decoders and voice encoders corresponding to the first and second registers $\alpha$ and $\beta$ to be put back in the conversion mode (step 532).

In the case where the CPU determines the absence of the call signal at the second register in step 525, the CPU checks whether or not the remaining second register other than the first register $\alpha$ has received an incoming call signal (step 534). Similarly, the CPU checks for an incoming call signal, when the CPU determines the absence of the selection signal at the second register $\beta$ having received the call signal in step 526 and when the CPU determines that A$\neq$B in step 528 (steps 536 and 538). If the CPU detects the absence of the incoming call signal, then it checks whether or not the timer has expired or timed out (steps 535, 537 and 539). If the timer has not timed out, then the control is returned back to steps 525, 526 and 525 respectively. When the remaining second register other than the first register $\alpha$ has received the incoming call signal in steps 534, 536 and 538 and when the CPU determines the time-out of the timer in the steps 535, 537 and 539, the timer is reset (steps 540 and 541) and control is returned back to step 521.

In this manner, since the through mode is executed and the decoding and encoding operations are not carried out during the relay operation of the PBX in the present embodiment, the quality of the voice signal will not deteriorate due to the repetitive decoding and encoding operation nor will the time delay of the signal be increased. For this reason, the present invention can be suitably applied to a network system that requires a high encoding efficiency (for example, 64 Kbps to 16 Kbps or 8 Kbps).

Further, a signal can be transmitted to the PBX in the form of PCM code at the stage of connecting control so that a signalling tone that is based on a dual-tone multifrequency (DTMF) signal system can be used or a system that sends a second dial tone back from the relaying PBX can be conveniently employed.

Figure 7:
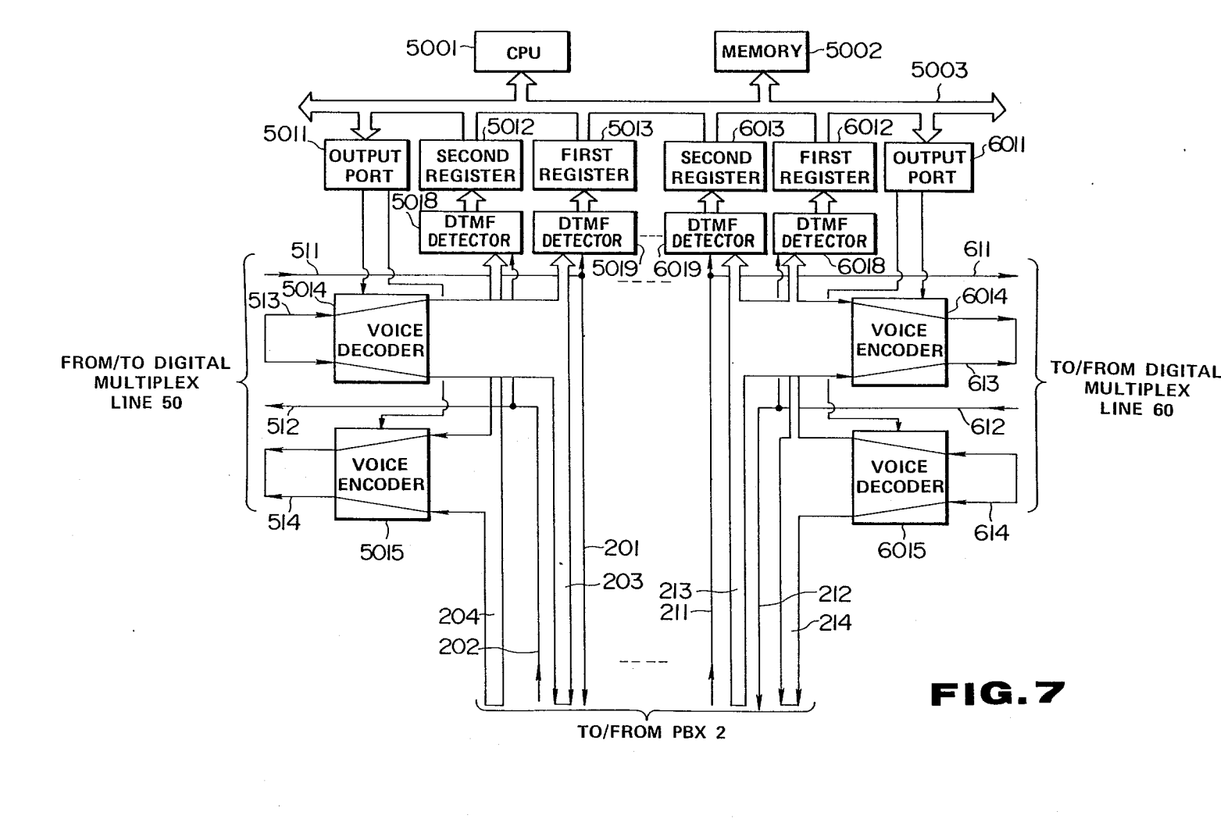
FIG. 7 is a block diagram showing another embodiment of the present invention.

Shown in FIG. 7 is another embodiment based on the DTMF signal system, in which signals applied to the signal lines 511 and 612 from the digital multiplex line sides and signals applied to the signal lines 201 and 211 from the side of the PBX have both such a waveform that rises from its OFF level to ON level when the system is changed to the calling mode and falls from its ON level to OFF level when the system is switched to the conversation-end (on-hook) mode, as shown in FIG. 8(b). Selection signals (DTMF signals) coming from the digital multiplex line sides are input through signal lines 513 and 614 to voice decoders 5014 and 6015 respectively, whereas selection number information (DTMF signals) coming from the PBX are input to the signal lines 204 and 213 as voice signals respectively.

More specifically, the DTMF signal input through the voice decoder 5014 is detected by the DTMF detector 5019 under the control of the signal on the signal line 511 and then stored in the first register 5013 as dial data. The DTMF signal, on the other hand, input through voice decoder 6015 is detected by the DTMF detector 6013 under the control of the signal on signal line 613 and then stored in first register 6012 as dial data.

The DTMF signal input to signal line 204 from PBX 2 is detected by DTMF detector 5018 under the control of the signal on signal line 202 and then stored in the second register 5012 as dial data. Similarly, the DTMF input to signal line 213 from PBX 2 is detected by the DTMF detector 6019 under the control of the signal on signal line 211 and then stored in the second registers 6013 as dial data. The operation other than the above is substantially the same as that of the embodiment of FIGS. 1 to 6.

Although the foregoing embodiment has been arranged so as to compare the selection number information received from the data multiplex line with that received from the PBX connected to the associated multiplex communication apparatus and to set the voice encoder and the voice decoder to be put in the through mode when coincidence is found between the two, it may be arranged so as to set the voice encoder and the voice decoder at the through mode immediately when the selection number received from the data multiplex line does not correspond to the PBX connected to the associated multiplex communication apparatus.

What is claimed is:

1. A multiplex communication system including a plurality of multiplex communication apparatuses and a plurality of exchanges each having a relay function, wherein each of said multiplex communication apparatuses is connected to a plurality of lines and to an associated one of said exchanges and includes a plurality of sets each corresponding to one of said lines, each of said sets comprising:

decoding means for decoding a voice signal sent from one of said lines and sending a decoded voice signal to the associated exchange;

encoding means for encoding a voice signal sent from the associated exchange and sending an encoded voice signal to the one of said lines;

means for sending to the exchange first selection number information received from the one of said lines;

means for sending to the one of said lines second selection number information received from the exchange;

first storage means for storing said first selection number information received from the one of said lines;

second storage means for storing said second selection number information received from the exchange; and control means for reading the first selection number information stored in said first storage means and the second selection number information stored in said second storage means, for detecting coincidence between the first and second selection number information, and for inhibiting operation of said encoding means and said decoding means when the first and second selection number information coincide.

2. A multiplex communication system as set forth in claim 1, wherein said first storage means includes a first register, said control means reads, when said first register receives from the line a call signal and thereafter selection number information, said first selection number information, said second storage means includes a second register, and said control means reads, when said second register receives from the associated exchange a call signal and thereafter selection number information, said second selection number information.

3. A multiplex communication system as set forth in claim 2, wherein said control means detects coincidence between said first and second selection number information when said second register receives said call signal from said exchange within a predetermined time after said control means reads said selection number information stored in said first register.

4. A multiplex communication system as set forth in claim 2, wherein said control means detects coincidence between said first and second selection number information when said second register does not receive a call responsive signal during a period after said control means reads said first selection number information stored in said first register until said second register receives said call signal from said exchange.

5. A multiplex communication system as set forth in claim 2, wherein said control means detects coincidence between said first and second selection number information when said second register in one set does not receive a call responsive signal during a period after said control means reads said first selection number information stored in said first register in said one set until said second register in another set receives said call signal from said exchange, and when said second register in said another set receives said call signal from said exchange within a predetermined time after the encoding and decoding control means reads said selection number information stored in said first register in said one set.

6. A multiplex communication system as set forth in claim 2, wherein said encoding and decoding control means detects coincidence between said first and second selection number information when said second register having received said call signal stores said selection number information within a predetermined time after said second register receives said call signal.

7. A multiplex communication system as set forth in claim 2, wherein said control means detects coincidence between said first and second selection number information when said second register in one set including said first register having received said selection number information does not receive said call responsive signal during a period after said second register in another set receives said call signal until said second register in said another set receives said selection number information from said exchange.

8. A multiplex communication system as set forth in claim 2, wherein said control means detects coincidence between said first and second selection number information when said second register in one set including said first register having received said selection number information does not receive said call responsive signal during a period after said second register in another set receives said call signal until said second register in said another set stores said selection number information from said exchange, and when said second register in said another set stores said selection number information from said exchange within a predetermined time after said second register in said another set receives said call signal.

9. A multiplex communication system as set forth in claim 2, wherein said control means inhibits the operations of said encoding means and said decoding means when said control means detects the coincidence between said first selection number information stored in said first register in one set and said second selection number information stored in said second register in another set within a predetermined time after the control means reads the selection number information stored in said first register in said one set.

10. A multiplex communication system as set forth in claim 2, wherein said control means inhibits the operations of said encoding means and said decoding means when said second register in one set does not receive said call responsive signal during a period after said control means reads said first selection number information stored in said first register in said one set until said control means detects the coincidence between said second selection number information stored in said second register in another set.

11. A multiplex communication system set forth in claim 2, wherein said control means inhibits the operations of said encoding means and said decoding means when said second register in one set does not receive said call responsive signal during a period after said control means reads said first selection number information stored in said first register in said one set until said control means detects the coincidence between said first selection number information stored in said first register and said second selection number information stored in said second register in another set, within a predetermined time after the control means reads the first selection number information stored in said first register in said one set.

12. A multiplex communication system including a plurality of multiplex communication apparatuses and a plurality of exchanges each having a relay function, wherein each of said multiplex communication apparatuses is connected to a plurality of lines and to an associated one of said exchanges and includes a plurality of sets each corresponding to one of said lines, one of said sets comprising:
  decoding means for decoding a voice signal sent from one of said lines and sending a decoded voice signal to the associated exchange;
  encoding means for encoding a voice signal sent from the associated exchange and sending an encoded voice signal to the one of said lines;
  means for sending to the exchange first selection number information sent from the one of said lines;
  means for sending to the one of said lines second selection number information received from the exchange;
  first detecting means for detecting said first selection number information received from the one of said lines;
  first storage means for storing the first selection number information detected by said first detecting means;
  second detecting means for detecting said second selection number information sent from the exchange;
  second storage means for storing said second selection number information detected by said second detecting means; and
  means for reading the first selection number information stored in said first storage means and the second selection number information stored in said second storage means, for detecting coincidence between the first and second selection number information, and for inhibiting operations of said encoding means and said decoding means when the first and second selection number information coincide.

13. A multiplex communication system as set forth in claim 12, wherein both of said first and second selection number information are provided respectively in the form of a dial pulse and said first and said second detecting means each comprises a dial pulse detector.

14. A multiplex communication system as set forth in claim 12, wherein both of said first and second selection number information are provided respectively in the form of a dual-tone multifrequency signal and said first and second detecting means each comprises a dual-tone multifrequency detector.

15. A multiplex communication system as set forth in claim 12, wherein said first detecting means detects said first selection number information from the output of said decoding means.

16. A multiplex communication system as set forth in claim 12, wherein said second detecting means detects said second selection number information from a signal sent from said exchange to said encoding means.

17. A multiplex communication system including a plurality of multiplex communication apparatuses and a plurality of exchanges each having a relay function, wherein each of said multiplex communication apparatuses is connected to a plurality of lines and to an associated one of said exchanges and includes a plurality of sets each corresponding to one of said lines, and wherein each of said sets includes decoding means for decoding a voice signal provided from one of said lines and sending a decoded voice signal to said exchange, and encoding means for encoding a voice signal provided from said exchange and sending a encoded voice signal to the one of said lines, each of said sets comprising:
  first detecting means for detecting first selection number information provided from the one of said lines;
  second detecting means for detecting second selection number information provided from the exchange; and
  means for inhibiting operations of said encoding means and said decoding means when said first selection number information detected by said first detecting means coincides with said second selection number information detected by said second detecting means.

18. A multiplex communication system as set forth in claim 17, wherein both of said first and second selection number information are provided respectively in the form of a dial pulse and said first and said second detecting means each comprises a dial pulse detector.

19. A multiplex communication system as set forth in claim 17, wherein both of said first and second selection number information are provided respectively in the form of a dual-tone multifrequency signal and said first and said second detecting means each comprises a dual-tone multifrequency detector.

20. A multiplex communication system including a plurality of multiplex communication apparatuses and a plurality of exchanges each having a relay function, wherein each of said multiplex communication apparatuses is connected to a plurality of lines and to an associated one of said exchanges and includes a plurality of sets each corresponding to one of said lines, and wherein each of said sets includes decoding means for decoding a voice signal provided from one of said lines and sending a decoded voice signal to said exchange, and encoding means for encoding a voice signal provided from said exchange and sending an encoded voice signal to the one of said lines, each of said sets comprising:

first detecting means for detecting first selection number information provided from the one of said lines;

second detecting means for detecting second selection number information provided from the exchange; and means for inhibiting operations of said encoding and said decoding means when said first selection number information detected by said first detecting means coincides with said second selection number information detected by said second detecting means, when a trunk of said exchange is in a call processing mode and not in a conversation mode or a disconnection mode.

21. A multiplex communication system as set forth in claim 20, wherein both of said first and second selection number information are provided respectively in the form of a dial pulse and said first and said second detecting means each comprises a dial pulse detector.

22. A multiplex communication system as set forth in claim 20, wherein both of said first and second selection number information are provided respectively in the form of a dual-tone multifrequency signal and said first and said second detecting means each comprises a dual-tone multifrequency detector.

23. A multiplex communication system including a plurality of multiplex communication apparatuses and a plurality of exchanges each having a relay function, wherein each of said multiplex communication apparatuses is connected to a plurality of lines and to an associated one of said exchanges and includes a plurality of sets each corresponding to each of said lines, and wherein each of said sets includes decoding means for decoding a voice signal provided from one of said lines and sending a decoded voice signal to said exchange, and encoding means for encoding a voice signal provided from said exchange and sending an encoded voice signal to one of said lines, each of said sets comprising:

detecting means for detecting selection number information provided from the one of said lines; and means for setting said encoding means and said decoding means in a through mode when said selection number information detected by said detecting means corresponds to one of said exchanges connected to the associated multiplex communication apparatus.

* * * * *